United States Patent
Lindman et al.

(10) Patent No.: US 9,538,053 B2
(45) Date of Patent: Jan. 3, 2017

(54) CAMERA TAMPERING PROTECTION

(71) Applicant: Axis AB, Lund (SE)

(72) Inventors: Niklas Lindman, Furulund (SE); Jonas Hjelmstrom, Staffanstorp (SE)

(73) Assignee: AXIS AB, Lund (SE)

( * ) Notice: Subject to any disclaimer, the term of this patent is extended or adjusted under 35 U.S.C. 154(b) by 63 days.

(21) Appl. No.: 14/548,720

(22) Filed: Nov. 20, 2014

(65) Prior Publication Data

US 2015/0172520 A1    Jun. 18, 2015

(30) Foreign Application Priority Data

Dec. 18, 2013  (EP) ..................... 13197959

(51) Int. Cl.
| | | |
|---|---|---|
| *G06K 9/00* | (2006.01) | |
| *H04N 5/225* | (2006.01) | |
| *G06K 9/46* | (2006.01) | |
| *G03B 11/04* | (2006.01) | |
| *G08B 13/196* | (2006.01) | |
| *G08B 29/04* | (2006.01) | |

(52) U.S. Cl.
CPC ......... *H04N 5/2252* (2013.01); *G03B 11/043* (2013.01); *G06K 9/46* (2013.01); *G08B 13/19619* (2013.01); *G08B 29/046* (2013.01)

(58) Field of Classification Search
None
See application file for complete search history.

(56) References Cited

U.S. PATENT DOCUMENTS

| | | | | |
|---|---|---|---|---|
| 7,874,744 B2 * | 1/2011 | Cirker | ............. | G08B 13/19634 |
| | | | | 396/427 |
| 9,230,176 B2 * | 1/2016 | Choi | ......................... | G06T 7/20 |
| 2003/0185556 A1 * | 10/2003 | Stiepel | .................. | F16M 11/06 |
| | | | | 396/427 |
| 2009/0080878 A1 | 3/2009 | Cirker | | |
| 2009/0185036 A1 * | 7/2009 | Bowron | ........... | G08B 13/19632 |
| | | | | 348/151 |
| 2011/0103786 A1 * | 5/2011 | Cirker | ............. | G08B 13/19634 |
| | | | | 396/427 |
| 2012/0274776 A1 * | 11/2012 | Gupta | ............. | G08B 13/19641 |
| | | | | 348/159 |
| 2014/0118554 A1 * | 5/2014 | Bucknor | ............. | H04N 5/2251 |
| | | | | 348/155 |

FOREIGN PATENT DOCUMENTS

DE         202 19 004 U1     3/2003

OTHER PUBLICATIONS

European Search Report issued Jun. 5, 2014 in European Application 13197959, filed on Dec. 18, 2013 ( with written opinion).

* cited by examiner

*Primary Examiner* — Wesley Tucker
(74) *Attorney, Agent, or Firm* — Oblon, McClelland, Maier & Neustadt, L.L.P.

(57) ABSTRACT

A protective camera enclosure (3) for a monitoring camera (1) comprises a cover portion (5) which is selectively moveable, in response to a detected tampering threat, from a retracted configuration exposing the camera (1) to an extended configuration covering and physically protecting the camera (1).

14 Claims, 4 Drawing Sheets

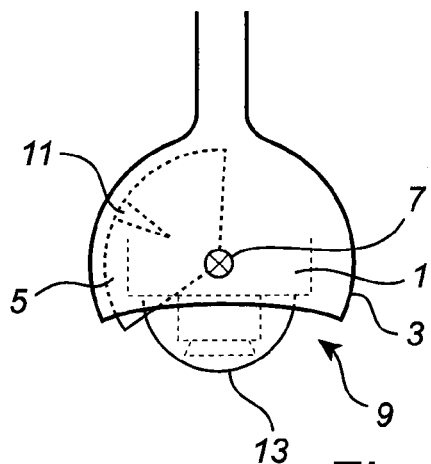 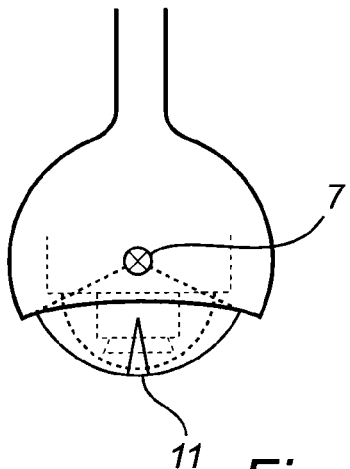
Fig. 1  Fig. 2
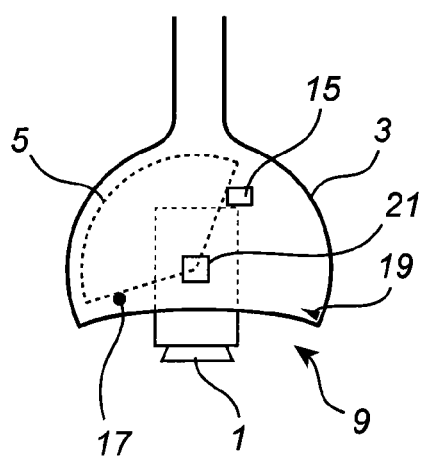 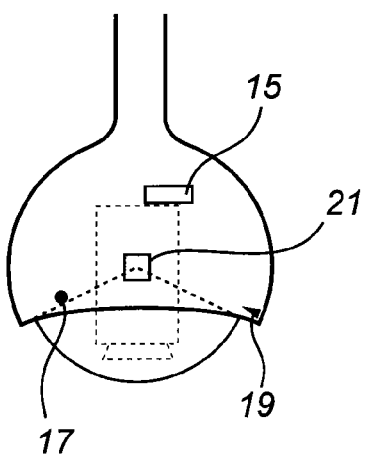
Fig. 3  Fig. 4
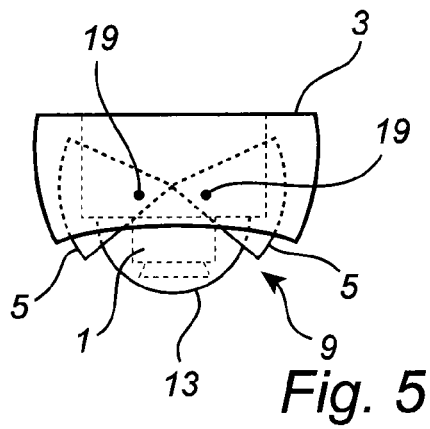 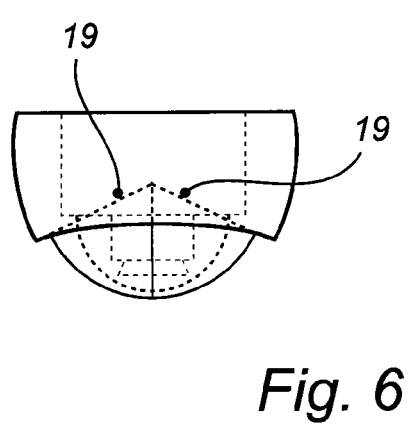
Fig. 5  Fig. 6

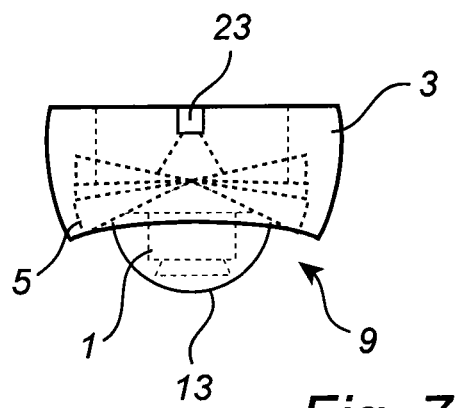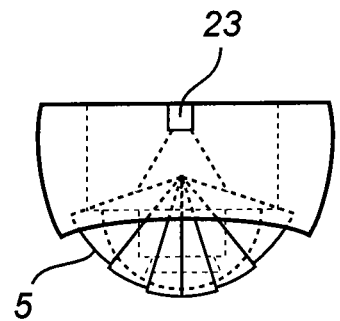
Fig. 7  Fig. 8
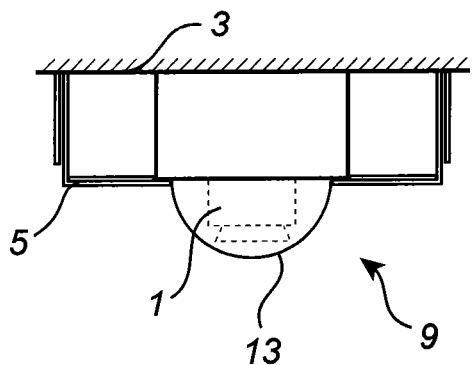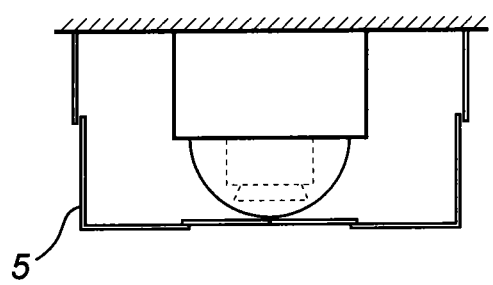
Fig. 9  Fig. 10
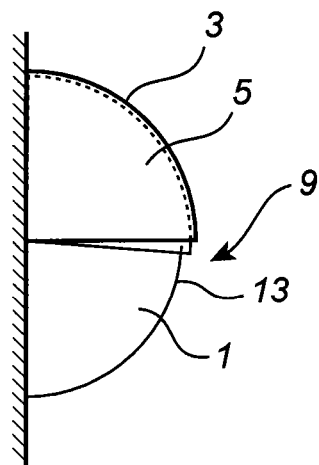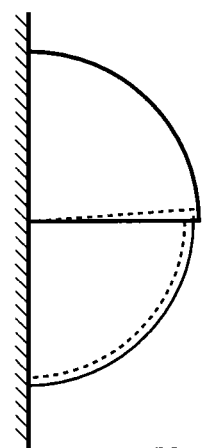
Fig. 11  Fig. 12

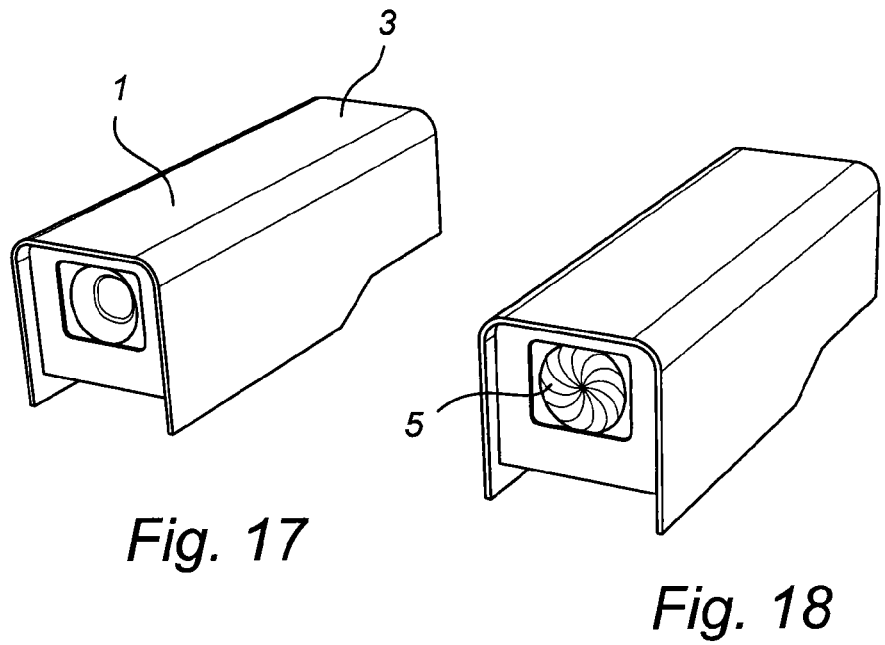
Fig. 17
Fig. 18
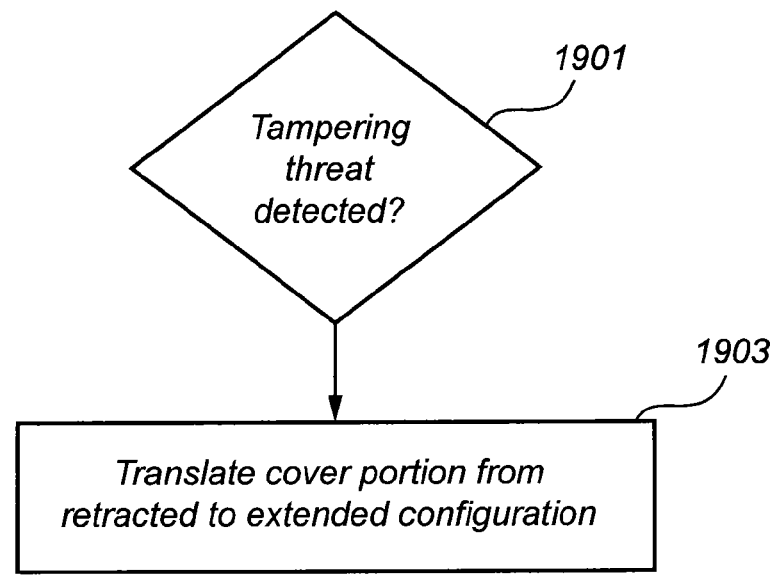
Fig. 19

CAMERA TAMPERING PROTECTION

TECHNICAL FIELD

The present invention relates to a camera with tampering protection as well as a method for camera tampering protection.

BACKGROUND

Surveillance cameras are currently used in many different applications, for monitoring environments both indoors and outdoors. Cameras may e.g. be used for monitoring areas where there is a high risk of unwelcome activities such as burglary or vandalism. In such situations there is also a risk that the camera itself may be exposed to sabotage or tampering actions aimed to stop the camera from monitoring the area. Some examples of such actions are spraying paint on the camera lens, covering the camera view by a cloth or kicking or hitting the camera. When the view of a camera is obstructed or the camera is damaged, the images that are produced by the camera, if any, are obviously of limited use for surveillance purposes, and, thus, the unwelcome activities may go on unnoticed by an operator receiving images from the camera. Maintenance personnel will also need to visit the camera to remove the obstruction, repair the camera or even replace it.

Several solutions to resolve the tampering issue have been suggested, such as mounting the camera in a hard to reach spot e.g. in a high ceiling. However, there is still room for improvement in this area.

US 2011/0103786 A1 discloses a privacy ensuring camera enclosure which is configured to dynamically change from the camera enclosing configuration to the surveillance configuration in response to a heightened threat level.

DE 202 19 004 U1 discloses a camera device for a motor vehicle or for a trailer connected to a motor vehicle. The camera device is placed in a housing with a cover piece for the camera lens. The cover piece is movable from a first position covering the lens to a second position not covering the lens. The housing with the cover piece protects the camera lens from rain and damage.

SUMMARY OF THE INVENTION

In view of the above, it is thus an object of the present invention to provide improved tampering protection for a monitoring camera. According to a first aspect of the invention a protective camera enclosure for a monitoring camera comprises a cover portion which is selectively moveable, in response to a detected tampering threat, from a retracted configuration exposing the camera to an extended configuration covering and physically protecting the camera. In this way the risk is greatly reduced for the camera to be damaged and the cost and labor of replacing or repairing willfully damaged cameras may be spared by protecting the camera from tampering attempts. An additional advantage is that the image quality for the camera mounted in the enclosure may be improved (in situations with no tampering threats). The first reason for the improved image quality is that there is no need to have a thick covering glass always in place to protect the camera. Such a glass causes aberrations or distortions which compromises image quality. Secondly, there is no need to mount the camera at a distance from such a glass to protect the camera from attacks to the glass. Mounting the camera at a distance from a glass means a high risk for reflections in the glass which also compromises image quality.

The cover portion may be dome shaped, which is especially suitable when the camera enclosure is used for so called dome cameras.

The cover portion may comprise two separate parts together forming a dome in the extended configuration. This embodiment makes it possible to reduce the size of the camera enclosure as the cover portion can be arranged inside the enclosure in a more compact way in the retracted configuration.

The cover portion may be in the form of a telescoping portion of the camera enclosure which envelops the camera in the extended configuration. This would also save place during the retracted configuration.

More specifically, the camera enclosure may comprise an opening and the cover portion may comprise at least one sliding panel covering the opening in the extended configuration and leaving the opening open in the retracted configuration.

The cover portion may additionally comprise a plurality of sliding plates forming a variable aperture mechanism.

In some embodiments the camera enclosure may comprise at least one groove which is arranged to guide the cover portion in a translational movement between the retracted configuration and the extended configuration. The groove may hold the cover portion in place both during the transition between the retracted and the extended configuration and in the extended configuration. This could be particularly advantageous when used in a box camera.

The cover portion may comprise at least one of the following: at least one slit or a semitransparent material. Both of these options would give the camera a limited view also when the cover portion is in the extended configuration, while still allowing the cover portion to be made of a highly impact resistant material.

The protective camera enclosure may comprise a tampering threat detection unit with a proximity sensor arranged to sense presence of an object in the proximity of the enclosure, such as a passive infrared sensor, an active light sensor, a capacitive sensor or an inductive sensor. All of these options are simple and low cost variants which reliably and quickly sense when an object is (too) close to the camera, i.e. when it is very likely that someone is attempting to sabotage the camera.

Additionally or as an alternative the protective camera enclosure may comprise a tampering threat detection unit with an image analysis processing unit configured to analyze images to detect a tampering threat situation, such as by detecting presence of an object occupying more than a threshold amount of pixels in an image. The image analysis unit may either receive images from a camera mounted in the camera enclosure, or from a separate imaging device, such as a small camera mounted on the outside of the camera enclosure, or another monitoring camera which is able to communicate with the image analysis unit. The image analysis unit itself may also be part of the camera mounted in the enclosure, such as in the form of a software component which is available for download to the camera when the camera is to be installed in the protective camera enclosure described herein, or it may be part of the protective camera enclosure. When the images are received from the camera in the enclosure and the image analysis unit is part of the camera, tampering threats may be detected without having to add a separate sensor. However, it may also be advantageous to provide a separate imaging analysis unit and possibly also a separate imaging device, in order to reduce the amount of connections between the enclosure and the camera mounted in the enclosure.

Additionally or as an alternative the protective camera enclosure may comprise a tampering threat detection unit with an autofocus analysis unit configured to receive an autofocus distance from a camera and detect a tampering threat if the autofocus distance is below a threshold value. A short autofocus distance is a simple way of indicating that an object is very close (too close) to the camera. The autofocus analysis unit may either receive autofocus distances from a camera mounted in the camera enclosure, or from a separate imaging device, just as for the image analysis unit discussed above. The autofocus analysis unit itself may also be part of the camera mounted in the enclosure, such as in the form of a software component which is available for download to the camera when the camera is to be installed in the protective camera enclosure described herein, or it may be part of the protective camera enclosure. When the autofocus distances are received from the camera in the enclosure and the autofocus analysis unit is part of the camera, tampering threats may be detected without having to add a separate sensor. However, it may also be advantageous to provide a separate autofocus analysis unit and possibly also a separate imaging device, in order to reduce the amount of connections between the enclosure and the camera mounted in the enclosure.

The tampering threat detection unit may be mounted on an outside of the enclosure and be adapted to sense absence or presence of a tampering threat when the cover portion is in the extended configuration. In this way it is possible to sense if the tampering threat has been removed. E.g. in case the camera enclosure includes means for translating the cover portion from the extended configuration to the retracted configuration, these may be activated when it is detected that the tampering threat has disappeared, and the camera may then unhindered carry on the monitoring of its surroundings.

The protective camera enclosure may comprise an elastic element biasing the cover portion in direction towards the extended configuration, and a retaining element holding the cover portion in the retracted configuration, wherein the retaining element is releasable to allow the cover portion to translate from the retracted position to the extended position by force of the elastic element in response to a detected tampering threat. This option gives a very rapid translation from the retracted configuration to the extended configuration which is advantageous in order to stop any tampering attempts before they are able to damage the camera.

The protective camera enclosure may comprise a lock mechanism arranged to lock the cover portion in the extended position. In this way it is not possible for someone trying to damage the camera to easily remove the cover portion to gain access to the camera.

As briefly mentioned above, the protective camera enclosure may comprise a retracting actuator arranged to translate the cover portion from the extended configuration to retracted configuration in response to lack of detection of a tampering threat, or lapse of a predetermined amount of time since detection of a tampering threat. In this way the camera can carry on monitoring as soon as the tampering threat has ceased.

The protective camera enclosure may comprise a pneumatic actuator arranged to perform one or more of the following:

a) retain the cover portion in the retracted configuration, b) translate the cover portion from the retracted configuration to the extended configuration, c) lock the cover portion in the extended configuration, d) translate the cover portion from the extended configuration to the retracted configuration.

A pneumatic actuator provides a space efficient and versatile way of both moving and keeping the cover portion in a desired configuration.

According to a second aspect of the invention a camera system comprises at least a first and a second camera, wherein at least the first camera has a protective camera enclosure as discussed herein, wherein the second camera is arranged to detect tampering threats to the first camera and communicate the detection of a tampering threat to the first camera or its protective camera enclosure.

The second aspect of the invention is associated with the same advantages as described above in connection with the first aspect. A further scope of applicability of the present invention will become apparent from the detailed description given below. However, it should be understood that the detailed description and specific examples, while indicating preferred embodiments of the invention, are given by way of illustration only, since various changes and modifications within the scope of the invention will become apparent to those skilled in the art from this detailed description. Hence, it is to be understood that this invention is not limited to the particular component parts of the device described or steps of the methods described as such device and method may vary. It is also to be understood that the terminology used herein is for purpose of describing particular embodiments only, and is not intended to be limiting. It must be noted that, as used in the specification and the appended claim, the articles "a," "an," "the," and "said" are intended to mean that there are one or more of the elements unless the context clearly dictates otherwise. Thus, for example, reference to "a portion" or "the portion" may include several devices, and the like. Furthermore, the word "comprising" does not exclude other elements or steps.

BRIEF DESCRIPTION OF THE DRAWINGS

The invention will now be described in more detail by way of example and with reference to the accompanying schematic drawings, in which:

FIG. 1 is a partially cut-away side view of a protective camera enclosure with a cover portion in a retracted configuration.

FIG. 2 shows the camera enclosure of FIG. 1 with the cover portion in an extended configuration.

FIG. 3 is a partially cut-away side view of the protective camera enclosure with the cover portion in a retracted configuration.

FIG. 4 shows the camera enclosure of FIG. 3 with the cover portion in an extended configuration.

FIG. 5 is a partially cut-away side view of another variant of the protective camera enclosure with the cover portion in a retracted configuration.

FIG. 6 shows the camera enclosure of FIG. 5 with the cover portion in an extended configuration.

FIG. 7 is a partially cut-away side view of another variant of the protective camera enclosure with the cover portion in a retracted configuration.

FIG. 8 shows the camera enclosure of FIG. 7 with the cover portion in an extended configuration.

FIG. 9 is a partially cut-away side view of another variant of the protective camera enclosure with the cover portion in a retracted configuration.

FIG. 10 shows the camera enclosure of FIG. 9 with the cover portion in an extended configuration.

FIG. 11 is a partially cut-away side view of another variant of the protective camera enclosure with the cover portion in a retracted configuration.

FIG. 12 shows the camera enclosure of FIG. 7 with the cover portion in an extended configuration.

FIG. 17 is a perspective view of another variant of the protective camera enclosure with the cover portion in a retracted configuration.

FIG. 18 shows the camera enclosure of FIG. 17 with the cover portion in an extended configuration.

FIG. 19 illustrates a method for protecting a camera against tampering.

DETAILED DESCRIPTION OF EMBODIMENTS

Figures 13, 14:
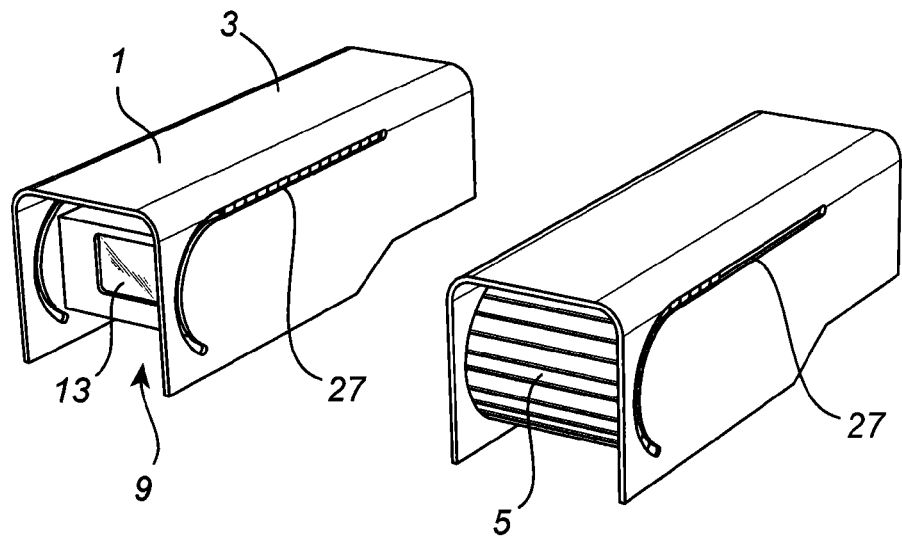
FIG. 13 is a perspective view of another variant of the protective camera enclosure with the cover portion in a retracted configuration.
FIG. 14 shows the camera enclosure of FIG. 13 with the cover portion in an extended configuration.

A monitoring camera 1 is mounted inside a protective camera enclosure 3 which is arranged to protect the camera against tampering attempts such as spraying of paint or external mechanical impact such as a hit from a baseball bat or similar, aimed at damaging the camera. The camera enclosure 3 includes a cover portion 5 which moves or translates from a retracted or open configuration or position to an extended or closed configuration or position, in response to a detected tampering threat, in order to protect the camera from tampering or sabotage.

The cover portion 5 shown in FIGS. 1-4 is in the form of a dome-shaped panel which can slide from a retracted configuration or position as shown in FIGS. 1 and 3 to an extended configuration or position as shown in FIGS. 2 and 4, by pivoting around an axis 7. In the extended configuration the cover portion covers a port or opening 9 in the camera enclosure 2, and in the retracted configuration the opening 9 is left open.

When the cover portion 5 is in its retracted configuration, the camera 1 functions in a conventional way, its view being unobscured by the cover portion 5. When a tampering threat has been detected and the cover portion 5 moves to its extended configuration, the camera 1 is at least partly enclosed by and thereby physically protected by the cover portion 5.

In order to withstand violent mechanical impacts the cover portion 5 is preferably made of a highly impact resistant material, e.g. metal such as stainless steel or a hard polycarbonate plastic material. The view of the camera 1 is then usually partly or wholly obscured by the cover portion 5 in the extended configuration, but, as the inventors have realized, in many situations this is still preferable to the camera 1 being damaged or tampered with, resulting in a need for maintenance or even replacement.

In order to allow the camera 1 to still depict some of the monitored area and possibly even the intruder trying to damage the camera 1 while the cover portion 5 is in the extended configuration, the cover portion 5 may have one or more slits 11 or openings allowing a limited view through the cover portion 5 also in the extended configuration. The cover portion 5 may additionally or as an alternative be made of an at least semitransparent material, such as the earlier mentioned plastic in a clear variant. Such a material will still affect the optical properties for the camera 1, but the captured images may be of some use.

It may be noted that in some of the figures, the cover portion 5 is illustrated as being transparent, and in others, the cover portion 5 is illustrated as being non transparent. Any embodiment of the cover portion 5 may however be wholly or partly manufactured from a transparent, semi-transparent or non-transparent material, with or without slits or openings.

Additional features may be added to the cover portion 5, such as a coating of a nanomaterial to keep paint or dirt from sticking to the cover portion 5. A cleaning device such as a brush or similar may also be arranged in the camera enclosure 3 to clean the cover portion 5 as it moves. Another option is also to arrange such a cleaning device on the cover portion 3 itself to clean any parts of the camera 1 which the cover portion 5 moves past during its transition between the retracted configuration and the extended configuration. The cover portion 5 may also be designed as a replacement part which is removed and replaced by a new one by e.g. an operator when it has moved once from the retracted to the extended configuration.

The camera 1 may also have an inner protective glass 13, as shown in FIGS. 1-2 and 5-14, which e.g. may be dome shaped or planar. The camera 1 may also lack the inner protective glass 13, as shown in FIGS. 3-4 and 15-18. The inner protective glass 13 primarily protects the camera 1 against dust and water. The cover portion 5 in all of its various embodiments is suitable for use both in combination with an inner protective glass 13 and in absence of an inner protective glass 13.

It may be noted that in a camera housing lacking the cover portion 5 described herein, such an inner protective glass 13 would often need to be designed with a certain thickness to, at least to some extent, withstand mechanical impacts, such as hits or kicks against the glass. For the same reason the camera might need to be mounted at a distance from this glass to reduce the risk of the camera being harmed when the protective glass is hit. Both of these could lead to a lower image quality. The thickness of the glass would introduce aberrations and if there is a distance between the camera and the glass there is a risk of light being reflected in the glass in turn causing glare in the images.

In the embodiments described herein, none of this is necessary since the camera 1 is protected by the cover portion 5 in any threatening situation. Thus, the image quality of the camera 1 is much less affected since the camera 1 may be mounted close to the inner protective glass 13 and this glass can be made thin.

In the following a number of exemplifying devices for translating and holding the cover portion 5 in its different configurations, as well as devices for detecting tampering threats and lack thereof, will be described with reference to the various embodiments shown in the drawings. It may be noted that even though not all devices are shown in combination with all embodiments of the cover portion 5, this is in no way to be construed as limiting. Any and all combinations may be made as desired between the embodiments of the cover portion 5 and the various other devices described herein.

The translation or movement of the cover portion 5 from the retracted configuration to the extended configuration may take place in various ways. It may be advantageous to choose an actuator or other element that allows a very rapid translation of the cover portion 5 to ensure that all tampering attempts are unsuccessful.

One example which is schematically illustrated in FIGS. 3-4 includes an elastic element 15, such as a spring element, biasing the cover portion 5 towards the extended configuration. As illustrated in FIGS. 3-4, the elastic element 15 is normally used in combination with a retaining element 17, e.g. in the form of a retractable pin holding the cover portion 5 in the retracted configuration against the force of the elastic element 15. When the retaining element 17 is released, the cover portion 5 is very rapidly pushed to the extended configuration by the elastic element 15. In other variants the elastic element 15 could be arranged to pull the cover portion 5 to the extended configuration.

As illustrated in FIGS. 3-6, the camera enclosure 3 can also include one or more locking elements 19 which lock the cover portion 5 in the extended configuration in order to make it more difficult for an intruder to retract the cover portion 5 from its extended configuration. Such a locking element 19 may e.g. be in the form of a snap lock or a pin which springs out to lock the cover portion 5 as soon as it reaches the extended configuration. The retaining element 17 and the locking element 19 could be combined and then e.g. be in the form of one or more spring loaded and retractable pins.

Another option which may be used for one of or both of the retaining element 17 and for the locking element 19 is an electromagnetic element. All of these options have the advantage of being reasonably fail proof, easily controlled and quick to release (and lock).

The camera enclosure 3 may also include a retracting actuator 21 for restoring or moving the cover portion 5 back to the retracted configuration. This is illustrated in FIGS. 3-4. The retracting actuator 21 may e.g. be activated or controlled by a camera operator, or it may be automatically operated to retract or open the cover portion 5 either when a certain time has lapsed since the detection of a tampering threat or when no tampering threat is detected. The retracting actuator 21 may e.g. be in the form of a motor, such as a step motor. This motor is preferably arranged not to interfere with the movement of the cover portion 5 during its translation from the retracted configuration to the extended configuration, so as to avoid slowing down this motion.

Another example, illustrated in FIGS. 7-8, for how the cover portion 5 is translated from the retracted to the extended configuration, is by a pneumatic actuator 23, e.g. using pressurized air, which pushes or pulls the cover portion 5 into the extended configuration. The pneumatic actuator could e.g. be driven by exchangeable pressurized air cartridges. The pneumatic actuator 23 could either be combined with a retaining element 17 as described above or in itself hold the cover portion 5 in the retracted configuration until a tampering threat is detected. The pneumatic actuator 23 may also be arranged to lock the cover portion 5 in the extended configuration. Additionally, the pneumatic actuator 23 could function as the retracting actuator 21 and transfer the cover portion 5 back to the retracted configuration.

As explained above, the cover portion 5 translates from the retracted configuration to the extended configuration in response to detection of a tampering threat. The tampering threat may be detected in various ways. Some examples are described below.

Figures 15, 16:
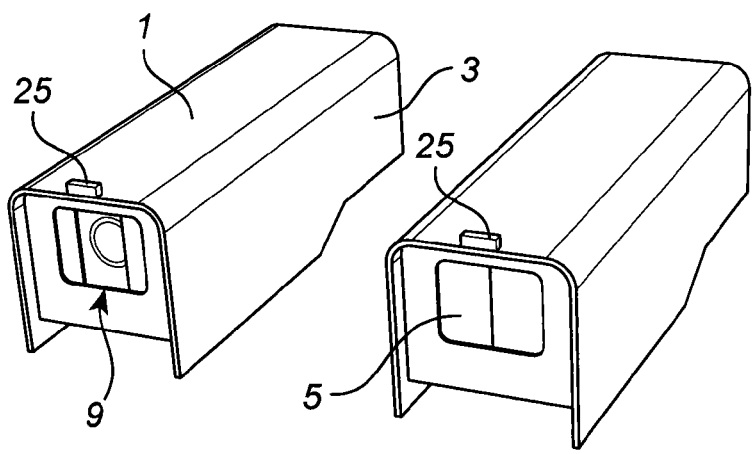
FIG. 15 is a perspective view of another variant of the protective camera enclosure with the cover portion in a retracted configuration.
FIG. 16 shows the camera enclosure of FIG. 15 with the cover portion in an extended configuration.

As illustrated in FIGS. 15-16, a tampering threat detection unit 25 may be arranged at the camera enclosure 3 to detect movement or presence of an object close to the camera enclosure 3, which in turn indicates that someone is attempting to damage the camera 1, e.g. by trying to spray paint at a camera lens or the protective inner glass 13, or by covering the camera with a cloth or by kicking or hitting the camera 1, e.g. by a baseball bat or similar. The threat detection unit 25 may e.g. include a proximity sensor, such as a passive infrared sensor, commonly denoted PIR sensor, an active light sensor, a capacitive sensor or an inductive sensor. One example of a distance that may be considered as close would be somewhere around 1.5 meters.

Another option is to include an image analysis unit in the tampering detection unit 25, or in other words to use some type of image analysis to detect a situation indicating a tampering attempt. One example is to detect if an object is taking up more than a certain amount of the camera view, which in turn indicates that an object is close, or more correctly too close, to the camera 1. The image analysis may take place in a dedicated processing unit or it may be run on a processor in the camera 1. The image analysis unit may in the latter case take the form of software which is loaded onto the camera 1 in connection with placing the camera 1 in the protective camera enclosure 3. Suitable connections are then made between the camera enclosure 3 and the camera 1 so that the result of the image analysis can be used to control the movement of the cover portion 5.

The tampering threat detection unit 25 may either be arranged so that it is protected by the cover portion 5 in its extended configuration, or it may, as indicated in FIGS. 15-16, be placed on an outside of the camera enclosure 3 so that it is able to sense if a tampering threat is present or not also when the cover portion 5 is in its extended configuration. If combined with a retracting actuator the latter case would allow the cover portion 5 to be retracted again once the tampering threat has disappeared.

Several monitoring cameras may also be setup to cooperate in a system such that one camera detects tampering threats directed to another camera in the system, i.e. one camera may detect if there is a threat to the other camera. In other words, several cameras in a system may intercommunicate to provide indications of tampering threats to each other which trigger a protective camera enclosure to close a cover portion to protect the camera which is threatened by a tampering attack. The other cameras in the system could then be seen as the tampering detection unit, or as an extra imaging unit, for a specific camera, and that specific camera would be part of the tampering detection unit or imaging device for the other cameras in the system. The other camera(s) could also detect when a tampering threat has been removed and inform a camera which is protected by a covering portion that the threat is gone and that the cover portion may be retracted again. The control of the cover portion and the analysis of images may take place in a central server or in a distributed manner, either at another camera or at the camera which is exposed to the threat.

Below now follows a discussion of the various embodiments of the camera enclosures shown in FIGS. 1-18.

In FIGS. 1-4, a camera enclosure 3 having a dome-shaped cover portion 5 is shown in a partially cut-away side view. A dome in this context is to be understood as a curved surface, possibly having several sections with different curvatures. FIGS. 5-6 show an embodiment where the cover portion 5 comprises two separate parts which together form a dome in the extended configuration. As shown, the latter alternative allows for a more compact design of the camera enclosure 3. The variants of the cover portion 5 that are dome shaped would e.g. be suitable for combining with a so called dome camera, which is a commonly used name for a camera which is mounted under a dome shaped surface, e.g. a dome shaped inner protective glass 13.

FIGS. 7-10 show partial cutaway side views of the protective camera enclosure 3 where the cover portion 5 is in the form of a telescoping portion of the camera enclosure 3, e.g. in the form of several panels, either shaped as sections of a dome or as straight or curved panels, which envelop and thereby protect the camera 1 in the extended configuration, as shown in FIGS. 8 and 10.

FIGS. 11-12 show a wall mounted dome camera where the enclosure 3 covers half the inner protective glass 13 e.g. for the purpose of shielding the camera from rain or sun light. The remaining half is left open in the retracted configuration of the cover portion 5 and is covered by the cover portion 5 in its extended configuration. In the retracted configuration the cover portion 5 is conveniently hidden inside this weather or sun protective part of the camera enclosure 3.

FIGS. 13-14 show a cover portion 5 in the form of a sectioned panel which slides in a track or groove 27 in the camera enclosure 3. In the extended configuration shown in FIG. 14 the cover portion closes the opening 9 and thereby protects the camera 1. The groove could as shown be in the form of an elongated and curved opening, but it could also be in the form another suitable guiding structure in a surface of the enclosure.

FIGS. 15-16 show a cover portion 5 which includes a pair of doors or panels that slide on door tracks or grooves. As shown in FIG. 16, in the extended or closed configuration, the doors are moved forward and in front of the camera 1 to protect it.

FIGS. 17-18 show a cover portion 5 in the form of a variable aperture mechanism. The variable aperture mechanism comprises a plurality of sliding plates or panels which can be closed and opened. When the plates are in the closed position, which corresponds to the extended configuration and is shown in FIG. 18, the orifice through which the camera 1 views the surroundings becomes very small or nonexistent, and the camera 1 is protected from tampering attempts.

In FIG. 19 a method according to embodiments of the invention is illustrated. In step 1901 it is checked whether a tampering threat is detected, and, if so, the cover portion is translated from the retracted to the extended configuration in step 1903.

It will be appreciated that a person skilled in the art can modify the above-described embodiments in many ways and still use the advantages of the invention as shown in the embodiments above. It may e.g. be noted that an alarm could be sent to an operator when a tampering threat is detected or when the cover portion is moved to the extended configuration. Also, the detection of the tampering threat as well as the control of the cover portion may take place at the camera, at the camera enclosure or outside these, and may also be split between different entities. In other words, the detection and/or the control may take place in the camera or in a device connected to the camera, or completely separate from the camera, such as if the protective camera housing is delivered as an accessory with its own intelligence. The detection and/or the control may also take place at another device which communicates with the camera or with the protective camera enclosure directly.

Thus, the invention should not be limited to the shown embodiments but should only be defined by the appended claims.

LIST OF REFERENCE NUMERALS

1: Camera
3: Camera enclosure
5: Cover portion
7: Rotational axis
9: Opening
11: Slit
13: Inner protective glass
15: Elastic element
17: Retaining element
19: Locking element
21: Retracting actuator
23: Pneumatic actuator
25: Tampering threat detection unit
27: Groove

The invention claimed is:

1. A protective camera enclosure for a monitoring camera, comprising a cover portion which is selectively moveable, from a retracted configuration exposing the monitoring camera to an extended configuration covering and physically protecting the monitoring camera,
   wherein the cover portion is selectively movable in response to a detected tampering threat, and that the protective camera enclosure further comprises a tampering threat detection circuit configured to:
   sense presence of an object in the proximity of the enclosure,
   analyze images to detect a tampering threat situation, by detecting presence of an object occupying more than a threshold amount of pixels in an image, or
   receive an autofocus distance from the monitoring camera and detect a tampering threat if the autofocus distance is below a threshold value.

2. The protective camera enclosure of claim 1, wherein the cover portion is dome-shaped.

3. The protective camera enclosure of , wherein the cover portion comprises two separate parts together forming a dome in the extended configuration.

4. The protective camera enclosure of claim 1, wherein the cover portion is in the form of a telescoping portion of the protective camera enclosure which envelops the monitoring camera in the extended configuration.

5. The protective camera enclosure of claim 1, wherein the protective camera enclosure comprises an opening and the cover portion comprises at least one sliding panel covering the opening in the extended configuration and leaving the opening open in the retracted configuration.

6. The protective camera enclosure of claim 5, wherein the cover portion comprises a plurality of sliding plates forming a variable aperture mechanism.

7. The protective camera enclosure of claim 1, wherein the protective camera enclosure comprises at least one groove, and wherein the groove is arranged to guide the cover portion in a translational movement between the retracted configuration and the extended configuration.

8. The protective camera enclosure of claim 1, wherein the cover portion comprises at least one of the following:
   at least one slit,
   a semitransparent material.

9. The protective camera enclosure of claim 1, wherein the tampering threat detection circuit is mounted on an outside of the protective camera enclosure and adapted to sense absence or presence of a tampering threat when the cover portion is in the extended configuration.

10. The protective camera enclosure of claim 1, further comprising:
    an elastic element biasing the cover portion in direction towards the extended configuration, and
    a retaining element holding the cover portion in the retracted configuration, wherein the retaining element is releasable to allow the cover portion to translate from the retracted configuration to the extended configuration by force of the elastic element in response to a detected tampering threat.

11. The protective camera enclosure of claim 1, further comprising a lock mechanism arranged to lock the cover portion in the extended configuration.

12. The protective camera enclosure of claim 1, further comprising a retracting actuator arranged to translate the cover portion from the extended configuration to retracted configuration in response to one of the following:
   lack of detection of a tampering threat, or
   lapse of a predetermined amount of time since detection of a tampering threat.

13. The protective camera enclosure of claim 1, further comprising a pneumatic actuator arranged to perform one or more of the following:
   a) retain the cover portion in the retracted configuration,
   b) translate the cover portion from the retracted configuration to the extended configuration,
   c) lock the cover portion in the extended configuration,
   d) translate the cover portion from the extended configuration to the retracted configuration.

14. A camera system comprising at least a first and a second camera, wherein at least the first camera has a protective camera enclosure according to claim 1, wherein the second camera is arranged to detect tampering threats to the first camera and communicate the detection of a tampering threat to the first camera or its protective camera enclosure.

* * * * *